United States Patent [19] | [11] 4,261,451
Strong | [45] Apr. 14, 1981

[54] CLUTCH DRAG CONTROLS FOR HOIST DRUM

[75] Inventor: Richard I. Strong, Green Bay, Wis.

[73] Assignee: Northwest Engineering Company, Green Bay, Wis.

[21] Appl. No.: 16,904

[22] Filed: Mar. 2, 1979

[51] Int. Cl.$^3$ ......................... B66D 1/26; F16D 67/02

[52] U.S. Cl. ................................ 192/12 R; 192/4 R; 192/17 A; 254/367

[58] Field of Search .................. 192/4 R, 12 R, 12 A, 192/14, 17 A; 254/185 R, 185 AB, 185 B

[56] References Cited

U.S. PATENT DOCUMENTS

| | | | |
|---|---|---|---|
| 2,703,162 | 3/1955 | Keim, et al. | 192/12 C |
| 2,947,397 | 8/1960 | Pietsch | 192/17 A X |
| 2,948,412 | 8/1960 | Nix | 192/4 R X |
| 3,268,211 | 8/1966 | Schlechter, et al. | 254/185 |
| 3,291,451 | 12/1966 | Trollope | 254/185 |
| 3,651,905 | 3/1972 | Brown | 192/4 R X |
| 3,939,950 | 2/1976 | Nishida, et al. | 192/4 R |
| 4,029,189 | 6/1977 | Freiburger | 192/12 C X |
| 4,143,856 | 3/1979 | Morrow | 254/185 R |

*Primary Examiner*—Lawrence J. Staab
*Attorney, Agent, or Firm*—Andrus, Sceales, Starke & Sawall

[57] ABSTRACT

A hoist drum control includes a drum clutch control pressure graduating valve (15) connected between a pressure air source (14) and a shuttle valve (21), the latter being connected in a line to the drum drive clutch cylinder (25). Quick release valves (22, 24) are disposed closely adjacent the clutch cylinder and the shuttle valve for releasing pressure in the clutch cylinder line. An adjustable drag regulator (16) and air supply poppet valve (17) is connected between the air source and the shuttle valve (21) and is actuatable to supply low pressure to the drum drive clutch cylinder (25) for dragging. A momentary return of the drum from dragging to full speed is accomplished by momentarily shifting the said pressure graduating valve (15) to an out-of-neutral mode to supply high pressure to the drum drive clutch cylinder (25). A normally open relay valve (20) is disposed in the line between the regulator (16) and poppet valve (17) and one side of the shuttle valve (21). A flow control valve (19) is connected between the pressure graduating valve (15) and the relay valve (20) and functions to permit opening or closing the latter. Pressurized air flows freely through the flow control valve (19) toward the relay valve (20), but is metered in the reverse direction to provide a time delay when shifting from momentary high pressure back to low drag pressure so that the low pressure is not applied to the drum clutch cylinder line (52) until said line is devoid of high pressure.

14 Claims, 5 Drawing Figures

CLUTCH DRAG CONTROLS FOR HOIST DRUM

BACKGROUND OF THE INVENTION

This invention relates to clutch drag controls for a hoist drum. Such controls are utilized to rotate the drum at desired speeds and in forward and reverse direction to raise and lower a load in a material handling device, such as a large vehicular crane or the like. Many hoists in such devices include a pair of drums to add flexibility of operation.

Heretofore, the controls for such drums have at times included a drum clutch control pressure graduating valve which was connected between a source of pressurized air and a shuttle valve, with the shuttle valve being connected in a line through a rotary union or joint at the drum shaft end to the clutch cylinder for the drum drive. A quick release valve was disposed closely adjacent the clutch cylinder for releasing pressure in the clutch line when desired.

In such prior constructions, an adjustable drag regulator and air supply poppet valve were connected between the source of pressurized air and the shuttle valve. In a dual drum system, when it was desired to apply a lower than full drive pressure to one drum drive clutch cylinder so that the drum could be utilized in a slow speed dragging operation compared to the other drum, the one drum clutch control pressure graduating valve was placed in neutral and the air supply poppet valve was actuated to supply air at reduced pressure to the shuttle valve.

At times of drag operation, it has often been desirable to momentarily return the one hoist drum to full speed, for example to keep the drum cable traveling at the same speed as the cable on a companion full-speed drum. This has previously been accomplished through circuitry wherein momentary actuation of the drum clutch control pressure graduating valve to an out-of-neutral mode has replaced the low pressure in the line downstream of the graduating valve with high pressure.

Problems have arisen with the above-described controls.

After the momentary increase to full drum speed described above, the system should promptly return the drum to slow dragging speed. Previously, it was noted that even though the controls were returned to drag mode, the drum would continue to rotate at fast speed for a time. The operator, following the settings of the controls in front of him, would think the drum was dragging, when in reality it was not. In some instances, the hook block or other attachment at the outer end of the hoist cable would sometimes quickly raise all the way up to the boom tip before the situation was discovered, requiring emergency fast action to stop the drum from rotating further.

In addition, and even with no drum dragging operation, it was noted that when the drum clutch control pressure graduating valve was shifted from a drive mode to a neutral mode, indicating at the console controls that the drum clutch was released by its cylinder, the drum would keep right on rotating so that cable movement undesirably continued for a number of feet before coming to a stop. Insertion of a quick release valve in the line closely adjacent the clutch cylinder to drain the said line was found not be be truly effective. Attempts over many years to solve the problem have not been successful.

SUMMARY OF THE INVENTION

The present invention is based on a discovery of the causes of the aforementioned problems, and the development of means to solve them.

As to the problem of false return to drag after momentary drum speedup, it was discovered that upon return of the controls to drag mode, insufficient time was being given to reduce the high line pressure to the drum clutch cylinder prior to applying the positive low pressure in the line. Therefore, in accordance with one aspect of the invention, means are provided to introduce a time delay into the circuitry so that no pressure will be reapplied to the drum clutch cylinder line until the high line pressure has dissipated. Thus, the drum drag will not be reinstated after momentary speedup until low line pressure can be effectively applied.

In the embodiment disclosed, a normally open relay valve is inserted in the line between the drum clutch drag regulator valve and one side of the shuttle valve. A flow control valve is connected in a line between the drum clutch control pressure graduating valve and the said relay valve. When the pressure graduating valve is in neutral, as during drum dragging, the flow control valve is essentially out of the operating circuit and the normally open relay valve passes low pressure air to the shuttle valve and hence to the drum clutch cylinder. When the pressure graduating valve is out of neutral and in an active mode, such as during momentary return of the hoist drum to full speed, the flow control valve permits free flow of high pressure air to the relay valve to block air flow therethrough toward the shuttle valve. A by-pass between the pressure graduating valve and the other side of the shuttle valve connects high pressure and to the drum clutch cylinder. Upon return of the pressure graduating valve to neutral, the flow control valve provides a metered time delaying reverse flow of high pressure air back to exhaust at the pressure graduating valve. During this delay, the relay valve remains closed so that low pressure air cannot yet flow through the line to the drum clutch cylinder, but awaits exhausting of the said line, as discussed below. The metering function of the flow control valve may be adjusted so that the relay valve is permitted to open substantially simultaneously with reduction of pressure in the drum clutch cylinder line to 0 p.s.i.

As to the problem of run-on of the hoist drum after returning of the drum clutch control pressure graduating valve to neutral, even with the quick release valve adjacent the drum clutch cylinder, it was discovered that such a quick release valve was inadequate to exhaust high air pressure from the line upstream therefrom, particularly in view of the fact that the said upstream line is normally quite long. Therefore, in accordance with another aspect of the invention, means are provided to augment the exhausting of the drum clutch cylinder line so that the high pressure therein is quickly dissipated. Run-on of the hoist drum is thereby substantially prevented.

In the embodiment disclosed, a second auxiliary quick release valve is located in the line between the drum clutch cylinder and the shuttle valve, and as close to the latter valve as possible. Any residual high pressure remaining in the long line between the two quick release valves will be quickly removed by the auxiliary quick release valve.

BRIEF DESCRIPTION OF THE DRAWINGS

The accompanying drawings illustrate the best mode presently contemplated by the inventor for carrying out the invention.

In the drawings.

DESCRIPTION OF THE PREFERRED EMBODIMENT

Figures 1, 5:
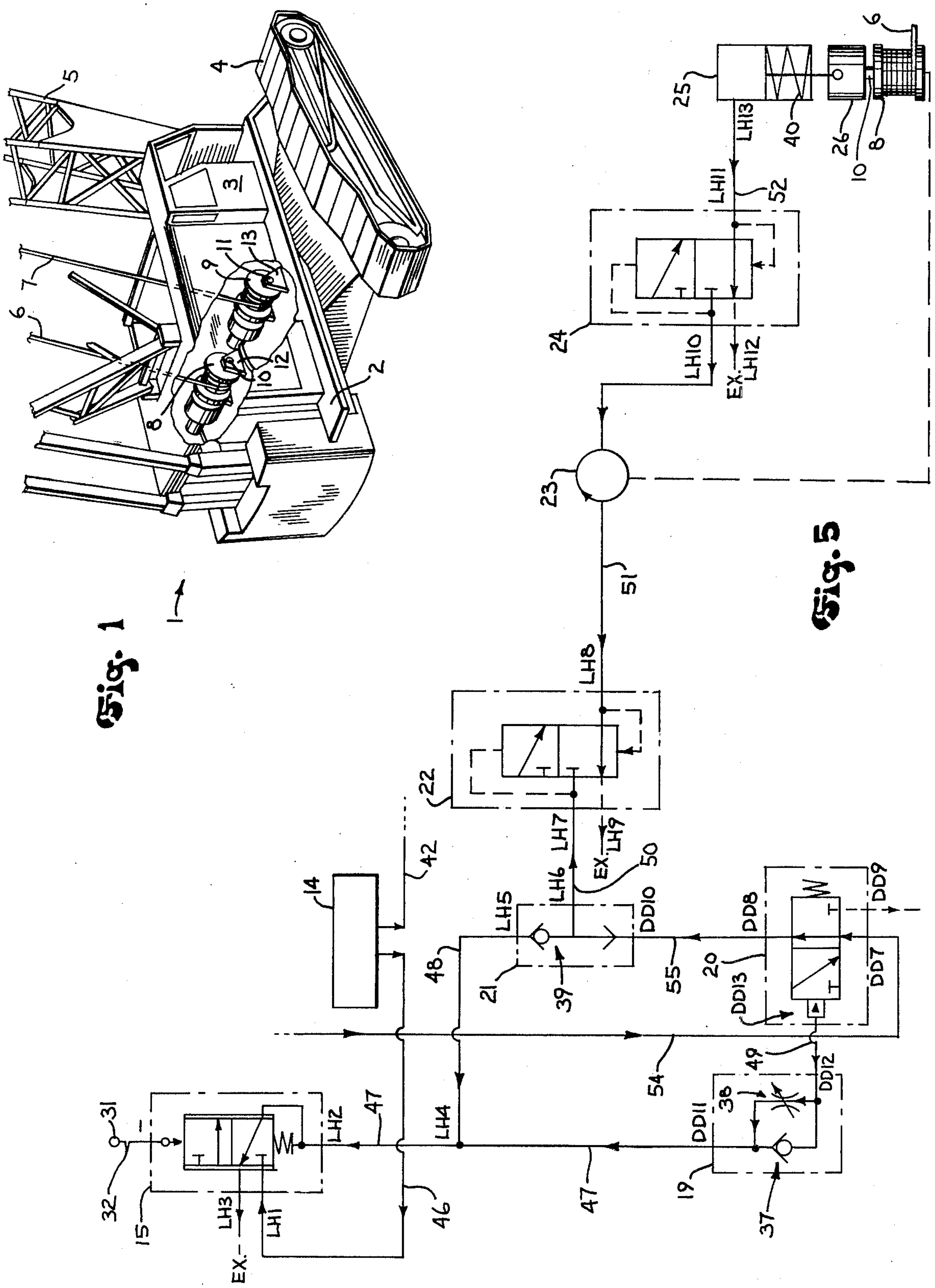
FIG. 1 is a fragmentary schematic perspective view of a material handling crane which embodies the concepts of the invention.
FIG. 5 is a schematic diagram illustrating the condition of the circuit during return of the said one drum from momentary full speed mode to dragging mode or to operation termination mode, and showing the metering time delay and downstream line exhausts.

As shown in FIG. 1 of the drawings, the concepts of the invention may be embodied in a vehicular crane 1 having a frame 2, an operator's cab 3, crawler treads 4 or the like and a pivotable boom 5. Boom 5 may have one or a plurality of hoist cables trained thereover for load handling purposes; the present embodiment having a pair of cables 6 and 7, designated as left and right respectively, which are wound around respective left and right hoist drums 8 and 9 mounted for individual rotation on shafts 10 and 11, which in turn are secured in bearing brackets 12 and 13 on frame 2. Drums 8 and 9 are adapted to be driven by mechanism to be described.

Figure 2:
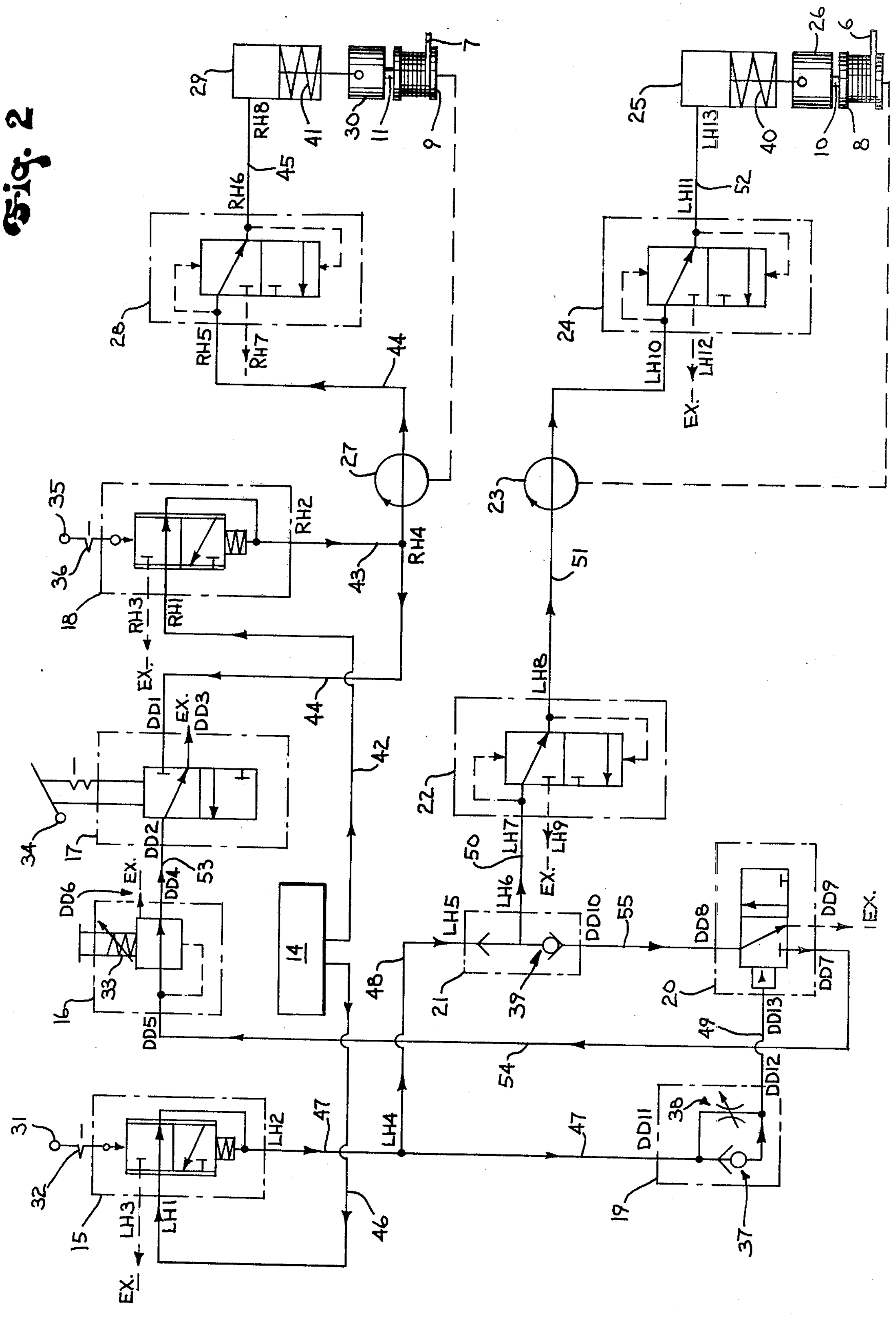
FIG. 2 is a schematic diagram of the control circuit for a pair of boom hoist drums showing individual normal full speed driving of each drum.

Turning now to FIG. 2, the control circuit for the drums is pneumatic in this instance, utilizing pressurized air provided from an air supply source, such as a manifold 14. The circuit could be other than pneumatic using any suitable pressurized fluid.

The circuit may be divided into three sections.

The first section comprises the primary control section which is preferably disposed in the operator's cab 3. This primary section comprises, generally, a left hand drum clutch control pressure graduating valve 15, a left hand drum clutch drag regulator 16, a drag regulator air supply poppet valve 17 and a right hand drum clutch control pressure graduating valve 18.

The second section may be disposed remote from the operator's cab 3 is desired, and is designated as the secondary control section. This secondary section comprises a flow control valve 19, a normally open relay valve 20, a shuttle valve 21, and a quick release valve 22.

The third section is disposed at the drums and is designated as the drum drive section. This section includes a left hand rotary union 23 which is disposed on the end of left drum shaft 10, a left quick release valve 24, and a left drum clutch cylinder 25 which is connected to a left clutch 26 on drum shaft 10. The section also includes a right hand rotary union 27 which is disposed on the end of right drum shaft 11, a right quick release valve 28, and a right drum clutch cylinder 29 which is connected to a right clutch 30 on drum shaft 11.

Left hand drum clutch control pressure graduating valve 15 is provided with a spring biased control lever 31 which is normally in neutral mode position but, when shifted, can be held in a drive or actuating mode position by a detent 32. Valve 15 has ports LH 1, LH 2, and LH 3, the latter being for exhaust.

Left hand drum clutch drag regulator 16 is adjustable as at 33 to control the amount of air pressure permitted downstream thereof. Regulator 16 has ports DD 4, DD 5 and DD 6, the latter being for exhaust.

Drag regulator air supply poppet valve 17 is provided with an "on-off" lever 34, and has ports DD 1, DD 2 and DD 3, the latter being for exhaust.

Right hand drum clutch control pressure graduating valve 18 is similar to valve 15. It is provided with a spring biased control lever 35 which is normally in neutral mode position but, when shifted, can be held in a drive or actuating mode position by a detent 36. Valve 18 has ports RH 1, RH 2 and RH 3, the latter being for exhaust.

Flow control valve 19 is a two-way valve incorporating a ball check 37 permitting free flow of fluid in one direction, and an adjustable restriction 38 which permits controlled metered flow of fluid in the opposite direction, as will be described. Valve 19 has ports DD 11 and DD 12.

Relay valve 20 is spring biased toward normal open position and has ports DD 7, DD 8 and DD 9, the latter being for exhaust. Valve 20 also has a pilot port DD 13 operatively connected to valve 15 for purposes to be described.

Shuttle valve 21 includes a two-way check 39 between opposed inlet ports LH 5 and DD 10, and an outlet port LH 6.

Quick release valve 22 is normally balanced but shifts when subjected to pressure in the adjacent line. It is provided with ports LH 7, LH 8 and LH 9, the latter being for exhaust.

Quick release valve 24 is similar to valve 22 and is provided with ports LH 10, LH 11 and LH 12, the latter being for exhaust.

Left drum clutch cylinder 25 is biased toward an unclutched position by a spring 40 and has a port LH 13.

Quick release valve 28 is similar to valves 22 and 24 and is provided with ports RH 5, RH 6 and RH 7, the latter being for exhaust.

Right drum clutch cylinder 29 is similar to cylinder 25, is biased toward an unclutched position by a spring 41 and has a port RH 8.

As shown in FIG. 2, when it is desired to operate right hoist drum 9 only, lever 34 of drag regulator air supply poppet valve 17 is shifted to "off" position and lever 35 of right hand drum clutch control pressure graduating valve 18 is shifted to a drive or actuating mode so that it is held by detent 36. Pressurized air may now flow from manifold 14 through a line 42 to inlet port RH 1 of valve 18 and hence through full pressure outlet port RH 2 to a line 43. Line 43 forms a T-connection RH 4 with a main line 44 which connects between port DD 1 of valve 17 and inlet port RH 5 of right quick release valve 28. However, valve 17 blocks flow in that direction. Therefore, the fluid will flow in the opposite direction, through right rotary union 27 and port RH 5. The line pressure causes valve 28 to shift so that fluid flows through outlet port RH 6, through a line 45 to inlet port RH 8 of right drum clutch cylinder 29. Clutch 30 will then engage to cause right hoist drum 9 to rotate.

When it is desired to operate left hoist drum 8 only, valve 17 remains blocked and lever 31 of left hand drum clutch control pressure graduating valve 15 is shifted to a drive mode so that it is held by detent 32. Pressurized air may now flow from manifold 14 through a line 46 to inlet port LH 1 of valve 15 and hence through full pressure outlet port LH 2 to a line 47. Line 47 forms a T-connection LH 4 wherein line 47 continues on to port DD 11 of flow control valve 19, or branches off into a main line 48 which connects to port LH 5 in shuttle valve 21.

Pressure fluid will open check 37 of valve 19 and freely flow through the latter, through outlet port DD 12 and a line 49 to pilot port DD 13 of normally open relay valve 20. This pressure causes valve 20 to close so that flow therethrough is blocked.

Pilot port DD 13 of course limits and blocks further fluid flow through the downstream portion of line 47. Fluid thus passes from T-connection LH 4 through main line 48 to inlet port LH 5 of shuttle valve 21. Check 39 shifts so that fluid flows out of valve 21 through port LH 6 and hence through a line 50 to inlet port LH 7 of quick release valve 22. This causes valve 22 to shift so that fluid flows through outlet port LH 8, through a line 51 having rotary union 23 therein, and hence to inlet port LH 10 of left quick release valve 24. The line pressure also causes valve 24 to shift so that fluid flows through outlet port LH 11, through a line 52 to inlet port LH 13 of left drum clutch cylinder 25. Clutch 26 will then engage to cause left hoist drum 8 to rotate.

In some instances, it may be desirable to cause a hoist drum to drag, that is, to turn at a slower speed than its normal full drive speed. The drum of a single hoist drum device can be caused to drag, and in multiple drum devices one or more of the drums can be suitably controlled to drag. In the present embodiment, circuitry is provided to cause left hoist drum 8 to drag.

Figure 3:
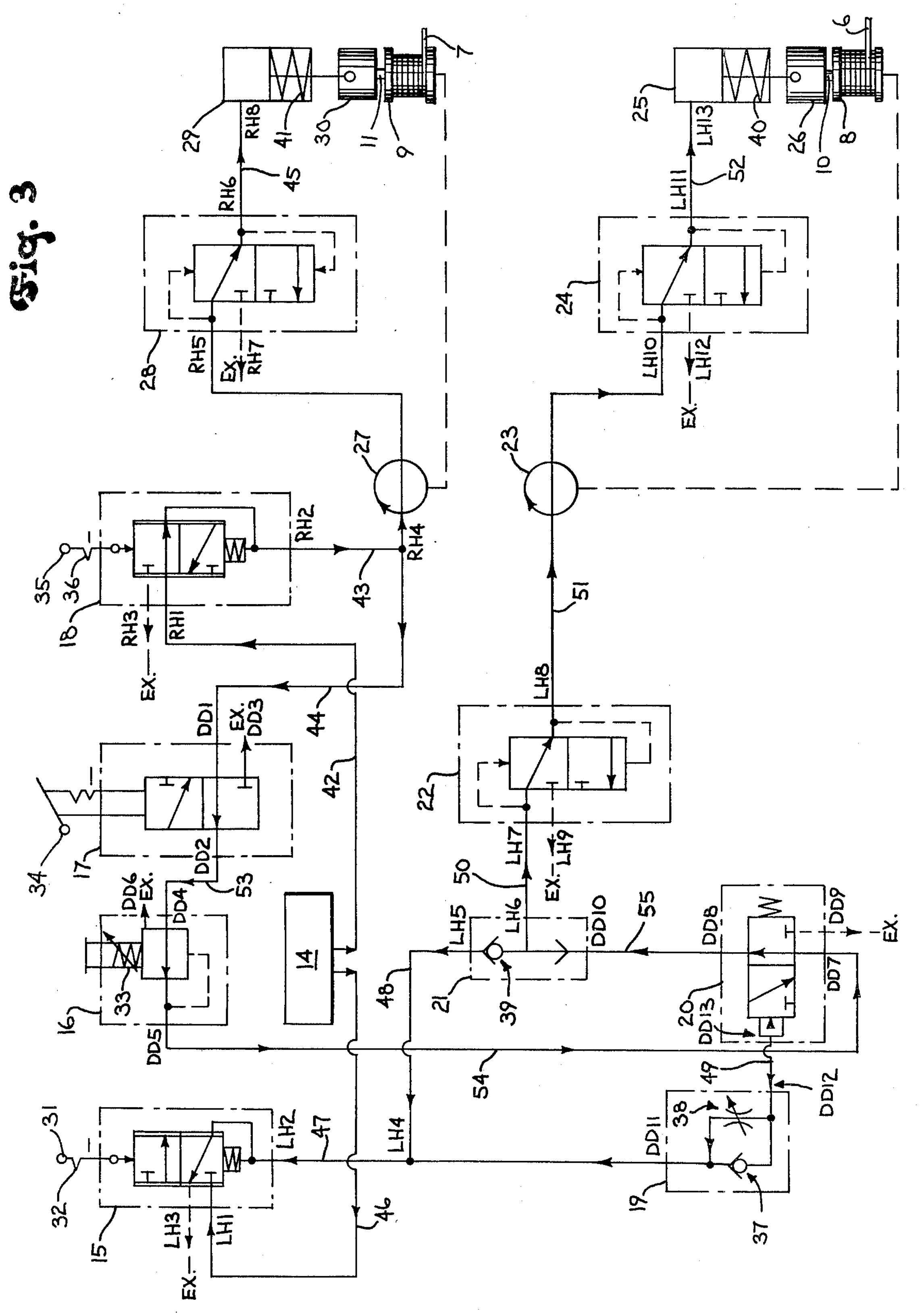
FIG. 3 is a schematic diagram illustrating the condition of the circuit during slow speed dragging of one of the boom hoist drums.

In this instance, and as illustrated in FIG. 3, left hand drum clutch control pressure graduating valve 15 is positioned in neutral and the normal high pressure, such as 90 p.s.i., is fed from manifold 14 to valve 18 which is in operating out-of-neutral mode, and hence to drag regulator air supply poppet valve 17, in this instance through line 42-44 and right hand drum clutch control pressure graduating valve 18. For dragging purposes, poppet valve lever 34 is shifted to "on" position, thus permitting fluid to flow from port DD 1 to DD 2 and hence through a line 53 to inlet port DD 4 of left hand drum clutch drag regulator 16. The adjustment 33 of regulator 16 should be set to provide a desired low output drag pressure at outlet port DD 5, such as 20 p.s.i. From port DD 5, fluid flows through a connector line 54 to pot DD 7 of relay valve 20. Valve 20 will be in its normal open position because the valve closing circuitry is connected to exhaust through port LH 3 of valve 15.

Subsequently, this low pressure fluid flows from port DD 8 of relay valve 20 and through a line 55 to inlet port DD 10 of shuttle valve 21, which is in opposed position from port LH 5 with check 39 therebetween. Fluid flows through outlet port LH 6 and hence to left drum clutch cylinder 25 in the same manner as previously described. However, in this instance, the low air pressure at port LH 13 causes a less firm slip-type clutching so that left hoist drum 8 rotates more slowly in a dragging manner.

At times, the dragging speed of left hoist drum 8 has been found to be too slow and it is sometimes desired to increase the speed of drum 8 momentarily so that its cable 6 is traveling at full speed, for example the same speed as right cable 7.

Figure 4:
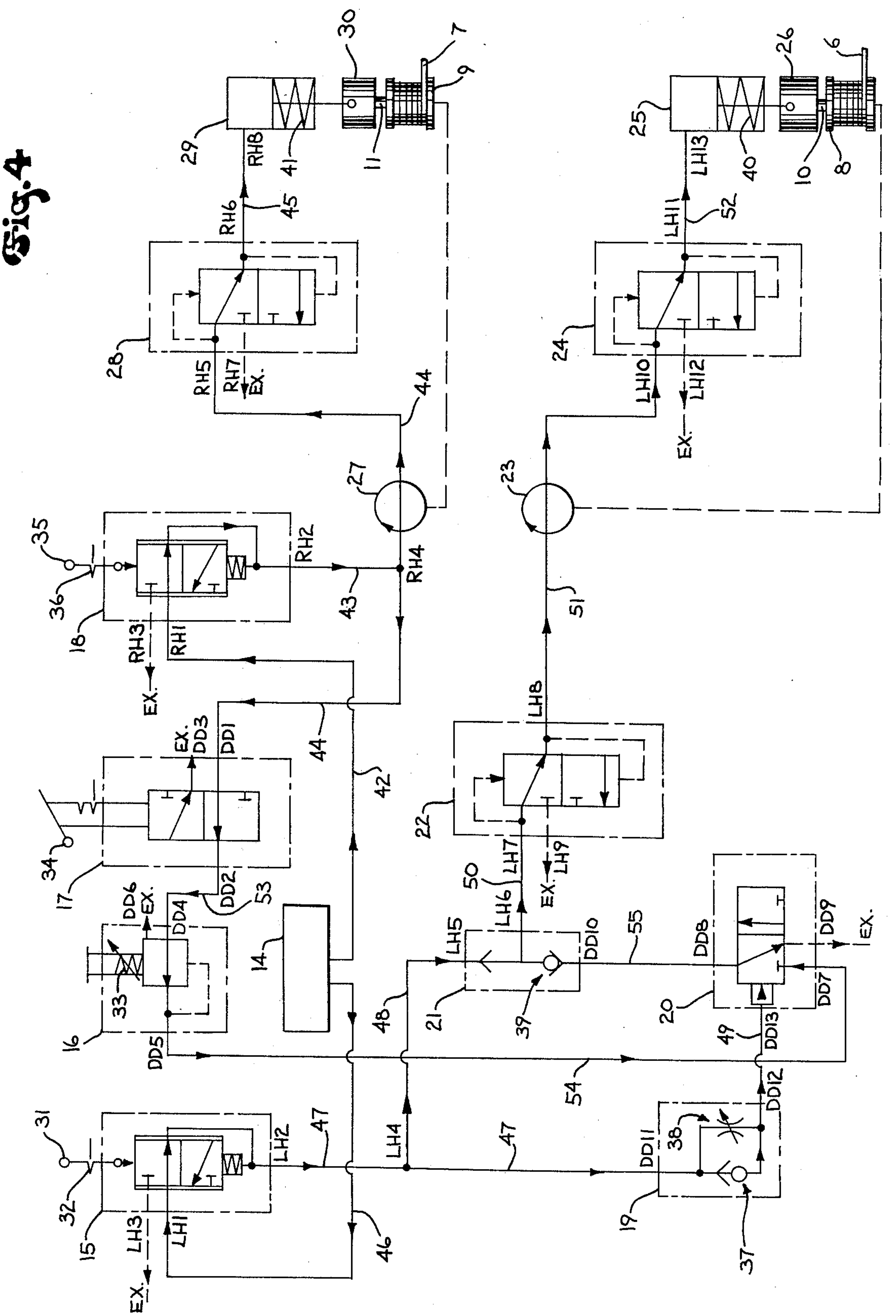
FIG. 4 is a schematic diagram illustrating the condition of the circuit during momentary return of one drum from a dragging mode to a full speed mode.

To accomplish a momentary speedup of drum 8, and as shown in FIG. 4, the operator momentarily shifts spring biased lever 31 of left hand clutch control pressure graduating valve 15 to take the valve out of neutral. This permits full high pressure fluid to travel from manifold 14 through line 46 and ports LH 1 and LH 2 of valve 15, through line 47, port DD 11 and valve check 37 to port DD 12 of flow control valve 19, and hence to pilot port DD 13 of relay valve 20. This causes valve 20 to close and block the low pressure fluid coming into valve 20 from line 54 to port DD 7 from reaching port DD 8 and traveling downstream thereof, as described above in relation to FIG. 3.

High pressure fluid can then travel from T-connection LH 4 through line 48 and ports LH 5 and LH 6 of shuttle valve 21, and hence through quick release valves 22 and 24 to left hand drum clutch cylinder 25 to cause full clutching and momentary return of drum 8 to full speed.

When it is desired to return from full speed of drum 8 to low dragging speed, the operator merely releases the spring biased control lever 31 to return valve 15 to neutral. This would normally block the high pressure fluid from traveling downstream of valve 15 to left drum clutch cylinder 25 and release the blocking action of relay valve 20 so that low pressure could be reapplied to the system.

However, and as pointed out previously, it has been discovered that upon return of valve 15 to neutral, the drum 8 continued to rotate at high speed rather than returning to low dragging speed.

At the exact moment of release of high pressure in lines 50, 51 and 52, the quick release valve means in these lines, such as valve 24, momentarily shifts to connect the downstream line, such as line 52, to exhaust, as through exhaust port LH 12. However, low pressure is reapplied to the quick release valve means and the exhaust port shuts before the high downstream line pressure can be properly exhausted through the exhaust port. Thus, there will still be high pressure downstream of the release valve means when the low pressure is again applied upstream, so that the drum will continue to rotate at high speed when it should be rotating at dragging speed.

One aspect of the inventive concept provides an automatic time delay feature to prevent re-application of low pressure to drum clutch cylinder 25 until the high pressure has been fully released through the quick release valve exhaust. The low pressure at port DD 7 of relay valve 20 continues to be blocked until the desired time delay has occurred.

for this purpose, and referring to FIG. 5, upon return of left hand drum clutch control pressure graduating valve 15 to neutral, high pressure fluid exhausts through valve part LH 3, causing a back-flow of fluid from pilot port DD 13 of relay valve 20, through flow control valve 19 and line 47. However, flow control valve 19 is constructed so that reverse flow through check 37 is impossible. Instead, the reverse flow must pass through the adjustable metering restriction 38. The restriction causes a time delay so that pressure at the pilot port DD 13 reduces slowly and valve 20 does not open until a predetermined time has elapsed. This predetermined time should be calculated so that valve 20 opens as soon as the high pressure has been exhausted from the quick release valve means.

In effect, the entire drum drive control system is shut down for a period during return from full speed to dragging to eliminate high pressure from the system before low pressure is again applied.

When the operator is operating left drum 8 at full speed, as discussed in connection with FIG. 2, and wishes to terminate cable operation altogether, he shifts lever 31 out of the detent-engaged position to bring left hand drum clutch control pressure graduating valve 15 back to neutral. Theoretically, this should immediately de-clutch drum 8 and stop rotation thereof. However, it has been observed that drum 8 undesirably continued rotating, even though a quick release valve 24 was in the circuit closely adjacent left drum clutch cylinder 25 for connecting downstream line 52 to its exhaust port LH 12 when valve 15 was put in neutral. This undesirable situation has existed for many years, and yet heretofore no suitable solution to the problem had been found.

One aspect of the invention is based on the discovery of the cause of the problem of drum run-on. In order for quick release valve 24 to connect clutch cylinder port LH 13 with exhaust port LH 12, the air pressure upstream of port LH 10 must be lower than in line 52. But, upon shifting valve 15 into neutral, air pressure relief was only possible far back in the system upstream of shuttle valve port DD 10. Because of the length of the upstream lines wherein, for example, combined lines 50 and 51 might often be as long as fifteen feet, a long time was needed to reduce the upstream line pressure to a point where quick release valve 24 would open to exhaust line 52.

In accordance with this aspect of the invention, means are provided in the line upstream from quick release valve 24 to augment the exhausting of pressure fluid from line 52.

For this purpose, and referring to FIG. 5, an auxiliary quick release valve 22 is positioned upstream from valve 24 and union 23 and downstream from but very closely adjacent to port LH 6 of shuttle valve 21. With such an arrangement, when valve 15 is shifted into neutral, line 51 is connected to exhaust port LH 9 of auxiliary valve 22, thus releasing the pressure at rotary union 23 and at port LH 10 of primary valve 24. The latter valve can then quickly function to release clutch 26 by exhausting air in line 52 through exhaust port 12. Drum 8 will therefor stop rotating substantially immediately.

The concepts of the invention provide a hoist drum control system of improved action wherein the drum is more completely under the operator's control at all times.

Various modes of carrying out the invention are contemplated as being within the scope of the following claims particularly pointing out and distinctly claiming the subject matter which is regarded as the invention.

I claim:

1. In a clutch control for a hoist drum, said control including a source (14) of pressurized fluid and a drum clutch actuating device (25):

(a) a control valve (15) connected to said fluid source, said valve having neutral and actuating modes and a full pressure outlet (LH 2), (b) drag regulator means (16, 17) connected to said fluid source, said drag regulator means having an outlet (DD 5) adapted to supply a drum drag pressure lower than the pressure at said full pressure outlet, (c) line means (47, 48, 50–52) connecting said full pressure outlet of said control valve with said clutch actuating device, (d) means (31) to shift said control valve from neutral to actuating mode so that full pressure fluid flows through said line means from said full pressure outlet toward said clutch actuating device, (e) a normally open relay valve (20) operatively connected to said full pressure outlet of said control valve, (f) said relay valve connecting said drag pressure outlet of said drag regulator means with said clutch actuating device to selectively supply low drag pressure to said device, (g) said relay valve being responsive to the modes of said control valve to close and block flow of drag pressure fluid therethrough toward said clutch actuating device when said control valve is in an actuating mode and to open and permit flow of drag pressure fluid therethrough toward said clutch actuating device when said control valve is in a neutral mode, (h) and means (38) to delay opening of said relay valve (20) to drag pressure fluid flow therethrough when said control valve (15) is shifted from actuating to neutral mode.

2. The clutch control of claim 1 in which said valve opening delaying means comprises: metering means connected between said full pressure outlet (LH 2) of said control valve (15) and said relay valve (20).

3. The clutch control of claim 1 or 2 in which said valve opening delaying means functions upon reverse flow of fluid from said relay valve (20) toward said control valve (15).

4. In the clutch control of claim 3: one way means (37) disposed between said full pressure outlet (LH 2) of said control valve (15) and said relay valve (20) for permitting free flow of pressurized fluid only toward said relay valve from said control valve.

5. In the clutch control of claim 1 or 2:

(a) a quick release valve (24) disposed in said line means (47, 48, 50–52) downstream of said control valve (15) and said normally open relay valve (20), (b) said quick release valve connecting said clutch actuating device (25) to exhaust (LH 13) during a change from full to drag pressure in the portion of the line means adjacent said quick release valve, (c) said valve opening delaying means (38) forming means to delay the application of low drag pressure through said relay valve (20) to said clutch actuating device (25) until the line portion (52) between said quick release valve and said clutch actuating device has been exhausted.

6. The clutch control of claim 1 in which:

(a) said drag regulator means (16, 17) has an "off" position blocking flow of drag pressure fluid to said relay valve (20) and an "on" position permitting such fluid flow, (b) said relay valve comprising means responsive to the actuating mode of said control valve (15) to block flow to drag pressure fluid toward said clutch actuating device (25) when said drag regulator means is in "on" position.

7. In the clutch control of claims 1 or 6:

(a) a second drum clutch actuating device (29), (b) and a second control valve (18) connected to said fluid source (14), said second control valve having neutral and actuating modes and having a full pressure outlet (RH 2), (c) said second control valve being connected between said source and said drag regulator means (16, 17) to supply full pressure fluid to the latter means when said second control valve is in said actuating mode.

8. In the clutch control of claim 1 or 6:

(a) a shuttle valve (21) connected in said line means (47, 48, 50-52) with said shuttle valve having opposed inlets, (b) one of said inlets (LH 5) being disposed in said line means and connected to said full pressure outlet (LH 2) of said control valve (15), with the other of said inlets (DD 10) being connected to said normally open relay valve (20), (c) said shuttle valve having an outlet (LH 6) disposed in said line means, said last-named outlet being connected to said clutch actuating device (25).

9. In the clutch control of claim 8:

(a) a quick release valve (24) disposed in said line means (47, 48, 50-52) downstream of the outlet port (LH 6) of said shuttle valve (21) and closely adjacent said clutch actuating device (25), (b) said quick release valve (24) connecting said clutch actuating device to exhaust (LH 12) when said control valve (15) is shifted from actuating mode to neutral mode.

10. In the clutch control of claim 9:

(a) an auxiliary quick release valve (22) disposed in said line means (47, 48, 50-52) downstream of the outlet (LH 6) of said shuttle valve (21) and closely adjacent said shuttle valve, (b) said auxiliary quick release valve connecting the portion (51) of the said line means disposed between said first-named quick release valve (24) and said auxiliary quick release valve to a second exhaust (LH 9) when said control valve (15) is shifted from actuating mode to neutral mode.

11. In the clutch control of claim 10:

(a) a rotary union (23) for driving the boom hoist drum, (b) said rotary union being connected in the portion (51) of said line means disposed between said first-named quick release valve (24) and said auxiliary quick release valve (22), (c) said rotary union being released when said line portion (51) is connected to exhaust (LH 9) by said auxiliary quick release valve.

12. In a clutch control for a hoist drum, said control including a source (14) of pressurized fluid and a drum clutch actuating device (25):

(a) a control valve (15) connected to said fluid source, said valve having neutral and actuating modes and a full pressure outlet (LH 2), (b) drag regulator means (16, 17) connected to said fluid source, said drag regulator means having an outlet (DD 5) adapted to supply a drum drag pressure lower than the pressure at said full pressure outlet, (c) line means (47, 48, 50-52) connecting said full pressure outlet of said control valve with said clutch actuating device, (d) means (31) to shift said control valve from neutral to actuating mode so that full pressure fluid flows through said line means from said full pressure outlet toward said clutch actuating device, (e) a relay valve (20) for connecting said drag pressure outlet of said drag regulator means with said clutch actuating device, (f) line means (47, 49) operatively connecting said full pressure outlet of said control valve with said relay valve, (g) and metering means (38) disposed in said last-named line means for metering reverse flow of fluid from said relay valve toward said control valve.

13. In the clutch control of claim 12: one way means (37) disposed in said last-named line means (47, 49) for permitting free flow of pressurized fluid only toward said relay valve (20) from said control valve (15).

14. In a clutch control for a hoist drum, said control including a source (14) of pressurized fluid and a drum clutch actuating device (25):

(a) a control valve (15) connected to said fluid source, said valve having neutral and actuating modes and a full pressure outlet (LH 2), (b) drag regulator means (16, 17) connected to said fluid source, said drag regulator means having an outlet (DD 5) adapted to supply a drum drag pressure lower than the pressure at said full pressure outlet, (c) line means (47, 48, 50-52) connecting said full pressure outlet of said control valve with said clutch actuating device, (d) means (31) to shift said control valve from neutral to actuating mode so that full pressure fluid flows through said line means from said full pressure outlet toward said clutch actuating device, (e) a shuttle valve (21) having inlets (LH 5, DD 10) connected to said control valve outlet and said drag regulator means outlet, (f) said shuttle valve having an outlet (LH 6) disposed in said line means and with said last-named outlet being connected to said clutch actuating device, (g) a first quick release valve (24) disposed in said line means downstream of the outlet of said shuttle valve and closely adjacent said clutch actuating device, (h) said first quick release valve connecting said clutch actuating device to a first exhaust (LH 12) when said control valve is shifted from actuating mode to neutral mode, (i) and a second quick release valve (22) disposed in said line means downstream of the outlet of said shuttle valve and closely adjacent said shuttle valve, (j) said second quick release valve connecting the portion (51) of the said line means disposed between said first and second quick release valves to a second exhaust (LH 9) when said control valve is shifted from actuating mode to neutral mode.

* * * * *

UNITED STATES PATENT AND TRADEMARK OFFICE
CERTIFICATE OF CORRECTION

PATENT NO. : 4,261,451

DATED : April 24, 1981

INVENTOR(S) : RICHARD I. STRONG

It is certified that error appears in the above-identified patent and that said Letters Patent are hereby corrected as shown below:

Column 2, Line 36, After "sure" delete "and"; Column 3, Line 54, After the numeral "3" delete "is" and substitute therefor ----if----; Column 5, Line 55, After "to" delete "pot" and substitute therefor ----port----; Column 6, Line 57, Delete "for" and substitute therefor ----For----; Column 6, Line 60, After "valve" delete "part" and substitute therefor ----port---- Column 8, Line 64, Claim 6, Delete "to" and substitute therefor ----of----; Column 9, Line 47, Claim 11, After "of" insert ----the----.

Signed and Sealed this

*Seventh* Day of *July 1981*

[SEAL]

*Attest:*

RENE D. TEGTMEYER

*Attesting Officer* *Acting Commissioner of Patents and Trademarks*